(12) United States Patent
Li et al.

(10) Patent No.: US 7,089,225 B2
(45) Date of Patent: Aug. 8, 2006

(54) EFFICIENT HEURISTIC APPROACH IN SELECTION OF MATERIALIZED VIEWS WHEN THERE ARE MULTIPLE MATCHINGS TO AN SQL QUERY

(75) Inventors: Ruiping Li, San Jose, CA (US); Irene Ching-Hua Liu, San Jose, CA (US); Lee-Chin Hsu Liu, San Jose, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/720,252

(22) Filed: Nov. 25, 2003

(65) Prior Publication Data

US 2005/0114307 A1    May 26, 2005

(51) Int. Cl.
G06F 7/00 (2006.01)
G06F 17/00 (2006.01)
(52) U.S. Cl. .............................................. 707/2; 707/3
(58) Field of Classification Search .................... 707/2, 707/3, 5, 6, 100, 201
See application file for complete search history.

(56) References Cited

U.S. PATENT DOCUMENTS

| 6,026,390 A | 2/2000 | Ross et al. ...................... 707/2 |
| 6,513,029 B1 | 1/2003 | Agrawal et al. ................ 707/2 |
| 6,567,802 B1 | 5/2003 | Popa et al. ..................... 707/3 |
| 6,882,993 B1* | 4/2005 | Lawande et al. ............... 707/2 |
| 2004/0034616 A1* | 2/2004 | Witkowski et al. ............ 707/1 |
| 2004/0122814 A1* | 6/2004 | Zhang et al. ................... 707/4 |
| 2004/0215626 A1* | 10/2004 | Colossi et al. .............. 707/100 |

OTHER PUBLICATIONS

Dimitra Vista, Optimizing Incremental View Maintenance Expressions in Relational Databases, University of Toronto, Canada, 1997 (pp. 1-5).*
DB2 UDB for z/OS V8: Through the Locking Glass and What SAP found there, IBM, Dec. 2003 (pp. 1-3).*
Randall Bello et al., "Materialized Views In Oracle," *Proceedings of the 24th VLDB Conference*, New York, USA, 1998, p. 659-664.

* cited by examiner

Primary Examiner—John R. Cottingham
Assistant Examiner—Kuen S. Lu
(74) Attorney, Agent, or Firm—Lacasse & Associates, LLC; Randy W. Lacasse; Ramraj Soundararajan

(57) ABSTRACT

A heuristic approach is used to order materialized view (MW) candidates in a list based on descending order of their reduction power. A query (e.g., SQL query) is then matched with the MVs in the list order, wherein searching is stopped when matching has been found. The query is matched with materialized views in the ordered list by identifying a materialized view candidate as follows: identifying an MV that is not locked by a REFRESH process; identifying a matching MV that does not require a regroup; identifying a matching MV that does not require a rejoin; identifying a matching MV that does not require a residual join; or identifying an MV with largest reduction power from the list of candidates.

21 Claims, 2 Drawing Sheets

EFFICIENT HEURISTIC APPROACH IN SELECTION OF MATERIALIZED VIEWS WHEN THERE ARE MULTIPLE MATCHINGS TO AN SQL QUERY

BACKGROUND OF THE INVENTION

1. Field of Invention

The present invention relates generally to the field of database query processing. More specifically, the present invention is related to efficient query processing with materialized views and heuristics operating on the materialized views.

2. Discussion of Prior Art

Materialized views (MVs, also known as materialized query tables (MQTs), or summary tables, etc.) are effective in improving the performance of decision support/reporting queries over very large databases by precomputing and materializing the result of queries into tables and automatically using them for answering queries. As users create many MVs to improve the performance of a variety of queries, some queries may potentially match multiple MVs. The matching algorithm for queries and MVs is computationally expensive. Such matching algorithms select an MV among many MVs matching a query (with specific attention devoted to avoiding unnecessary matching).

The traditional approaches include one of the following:
1) find the first match and then stop searching for other alternatives. This approach may result in missing better MVs.
2) find all MVs that match, and then select one using various criteria. This approach may suffer excessive cost for matching, since—the matching logic is quite complex and computationally expensive.
3) match based on the query and MV characteristics, such as matching aggregate queries with MVs with aggregates first, etc. This approach may still require many extra matchings.

The U.S. patent to Ross et al. (U.S. Pat. No. 6,026,390) provides for a method of incrementally maintaining a first materialized view of data in a database, by means of an additional materialized view. These additional materialized views are introduced to reduce the cost of maintaining the target materialized view for base table updates. The method of Ross et al. aids in maintaining views; in particular, the method allows for incrementally maintaining materialized views.

The U.S. patent to Agrawal et al. (U.S. Pat. No. 6,513,029) discloses a method used to recommend a set of materialized views and their given indexes for a given database workload. Candidate materialized views are obtained by first determining subsets of tables referenced by queries, and then finding interesting table subsets. Next, interesting table subsets are considered on a per query basis to determine which are syntactically relevant to a query. Materialized views that are likely to be used by queries are then generated.

The U.S. patent to Popa et al. (U.S. Pat. No. 6,567,802) discloses a query optimization technique called chase/backchase. The technique is used to systematically optimize queries by generating alternative query plans aimed at multiple disparate targets. Popa's technique deals with query rewrite and does not address the issue of how to select a materialized view from multiple matches to a given query.

Oracle's paper entitled, "Materialized Views in Oracle," published in Proceedings of the 24th VLDB Conference New York, USA, 1998, pages 659–664, discloses a selection process that belongs to the abovementioned third approach.

Whatever the precise merits, features, and advantages of the above cited references, none of them achieves or fulfills the purposes of the present invention.

SUMMARY OF THE INVENTION

The present invention provides for a method to use efficient heuristics in selecting a materialized view (MV) from multiple materialized views matching a query. To reduce the number of matchings to a minimum, the heuristics order MV candidates in a list based on descending order of their reduction power, then match the query with MVs in the list order, and stop searching as soon as a good enough matching is believed to be found. The method comprising the steps of: (a) receiving a query, Q; (b) ordering materialized view candidates in a list based upon a descending order of reduction powers, wherein reduction power of a materialized view, M, is defined as a product of cardinalities of common tables, T1 through Tn, between query, Q, and the materialized view definition, divided by the cardinality of M and is given by: |T1|* ... *|Tn|/|M|; and (c) matching a query with materialized views in the ordered list by identifying a materialized view candidate not locked by a REFRESH process, said matching performed as follows:

identifying a matching MV that does not require regrouping, else;

identifying a matching MV that does not require a rejoin, else;

identifying a matching MV that does not require a residual join, else;

identifying an MV with largest reduction power from the list of candidates.

It should be noted that, in one embodiment, there is a separate step in choosing the rewritten query or the original query based on cost after query rewrite is finished as it is too expensive to choose an MV among multiple matchings based on cost.

The present invention's approach does not just take the first matching and, hence, it is less likely to miss a better matching. It does not perform an exhaustive search either (except for the worst cases), but stop at a time that a good matching is found based on heuristics.

DESCRIPTION OF THE PREFERRED EMBODIMENTS

Figure 1:
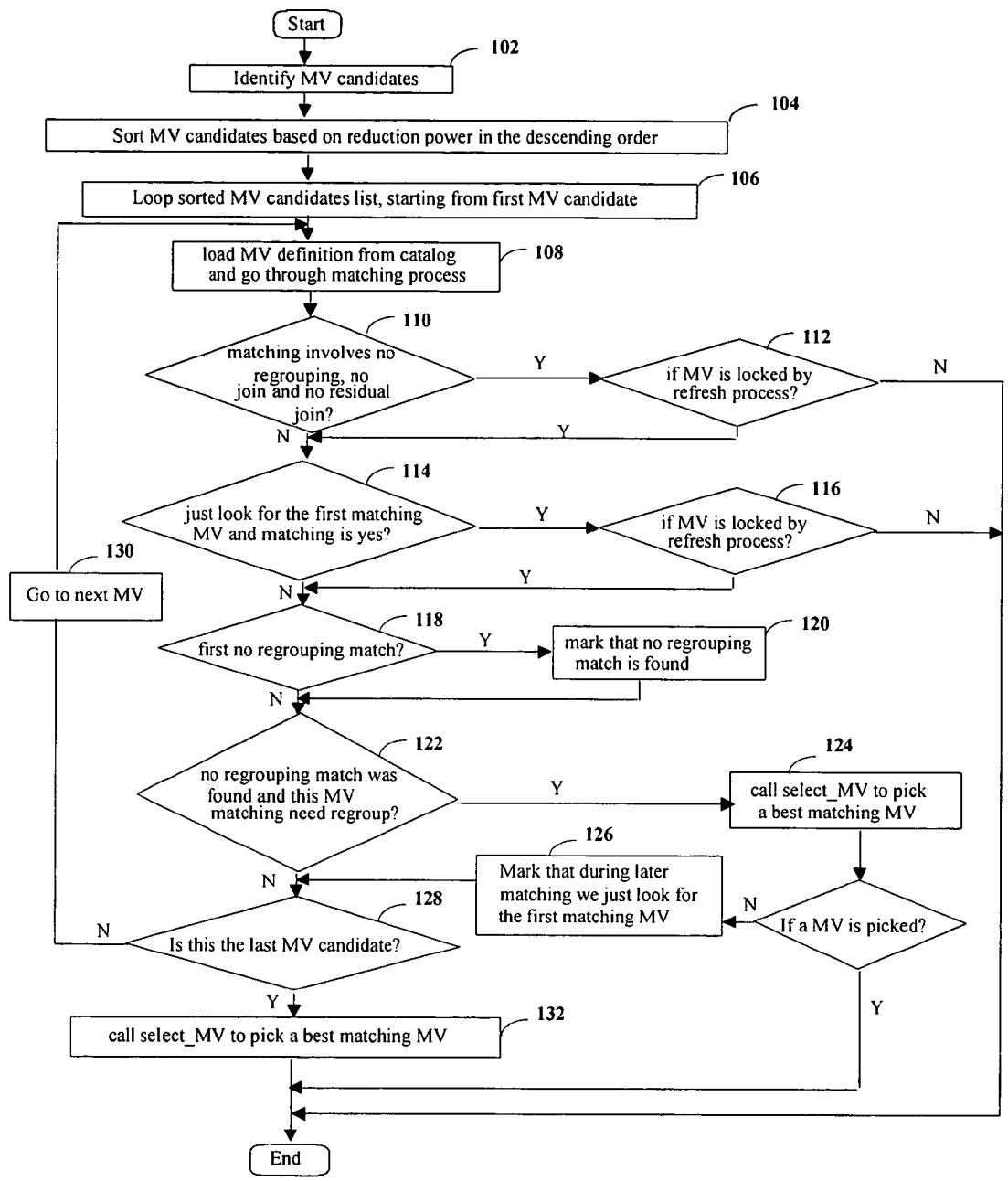
FIGS. 1 and 2 illustrate a method associated with the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

In the matching logic for query Q and materialized view M with V as its query definition, the tables involved in Q and V need to be mapped. The following terminology is used to refer to the tables involved:

Common Tables: tables that appear in the FROM clause of both Q and V. Usually common tables are replaced by materialized view M after query rewrite.

Residual Tables: tables that appear in the FROM clause of Q only. After query rewrite, these tables remain in the query.

Rejoin Tables: common tables that remain in the query after query rewrite to derive non-key columns through joins using primary keys.

Extra Tables: tables that appear in the FROM clause of the query definition, V, of M only. These tables are not used for the query.

Regrouping is used to aggregate the data on top of already aggregated data from materialized views to get the summary data requested by the query. Provided below is a simple example:

M with query definition:
SELECT T1.C1, T1.C2, SUM(T1.C3) as S
FROM T1
WHERE T1.C4>10
GROUP BY T1.C1, T1.C2;
Q:
SELECT T1.C1, SUM(T1.C3)
FROM T1
WHERE T1.C4>10
GROUP BY T1.C1;

After query rewrite using M, regrouping (or re-aggregation) is needed for Q:
SELECT M.C1, SUM(M.S)
FROM M
GROUP BY M.C1;

Alternatively, no regrouping is a scenario wherein there is no need to aggregate the data again on top of aggregated data from materialized views to get the summary data the query asks for. Provided below is a non-regrouping example:

M with query definition:
SELECT T1.C1, T1.C2, SUM(T1.C3) as S
FROM T1
WHERE T1.C1>10
GROUP BY T1.C1, T1.C2,
Q:
SELECT T1.C1, T1.C2, SUM(T1.C3)
FROM T1
WHERE T1.C1>15
GROUP BY T1.C1, T1.C2;

After query rewrite using M, there is no need for regrouping Q:
SELECT M.C1, M.S
FROM M
WHERE M.C1>15

A join needed to join back a base table that is already in M is called a rejoin. Provided below is a simple example:

M with query definition:
SELECT T1.C1
FROM T1
WHERE T1.C4>10;
Q:
SELECT T1.C1, T1.C2
FROM T1
WHERE T1.C4>15, After query rewrite using M, in order to get the value of T1.C2 and T1.C4, T1 needs to be joined back with M:
SELECT M.C1, T1.C2
FROM M, T1
WHERE M.C1=T1.C1 AND T1.C4>15;

A join in Q involving a residual table is called a residual join. Provided below is a simple example:

M with query definition:
SELECT T1.C1, T1.C2
FROM T1
WHERE T1.C1>50;
Q:
SELECT T1.C1, T2.C1
FROM T1, T2
WHERE T1.C2=T2.C2 AND
T1.C1>100;

After query rewrite using M, a join with T2 is needed:
SELECT M.C1, T2.C1
FROM M, T2
WHERE M.C2=T2.C2 AND M.C1>100;

The reduction power of a materialized view, M (with query definition, V), for a query block is defined as the product of the cardinalities of the common tables, divided by the cardinality of M. Assuming that there exist common tables T1, T2, . . . , Tn for Q and V, the reduction power for M with respect to Q is given by:

$|T1|*|T2|* \ldots *|Tn|/|M|$

For example, for a given Q, the reduction power for two MVs are calculated as follows:

(1) for M1, there are two common tables, with cardinalities 10,000 and 10,000,000, and the cardinality of M1 is 5,000. Then, the reduction power for M1 with respect to Q is 10,000*10,000,000/5,000=20,000,000.

(2) for M2, there are three common tables, with sizes 10,000, 10,000,000, and 5,000, and the size of M2 is 20,000. Then the reduction power for M2 with respect to Q is 10,000 * 10,000,000 * 5,000/20,000=25,000,000,000.

Therefore, although M1 is smaller, M2 has a larger reduction power, and might be better for Q, because it shares three common tables with Q.

When there are multiple matching MVs, the following principles (heuristic rules) apply:

1. Avoid matching for all MV candidates and stop as early as possible.
2. Avoid choosing an MV which is being locked by REFRESH process.
3. Choose a matching that does not require regrouping, if there is one.
4. Choose a matching that does not require rejoining, if there is one.
5. Choose a matching that does not have a residual join, if there is one.
6. Otherwise, choose the one with the largest reduction power.

Hence, the present invention provides for a method to use efficient heuristics in selecting a materialized view (MV) from multiple materialized views matching a query. To reduce the number of matchings to a minimum, the heuristics order MV candidates in a list based on descending order of their reduction power, then match the query with MVs in the list order, and stop searching as soon as a good enough matching is believed to be found. The method comprising the steps of: (a) receiving a query, Q; (b) ordering materialized view candidates in a list based upon a descending order of reduction powers, wherein reduction power of a materialized view, M, is defined as a product of cardinalities of common tables, T1 through Tn, between query, Q, and materialized view definition, V, divided by the cardinality of M and is given by: $|T1|* \ldots *|Tn|/|M|$; and (c) matching a query with materialized views in the ordered list by identifying a materialized view candidate not locked by a REFRESH process, said matching performed as follows:

identifying a matching MV that does not require a regroup, else;

identifying a matching MV that does not require a rejoin, else;

identifying a matching MV that does not require a residual join, else;

identifying an MV with largest reduction power from the list of candidates.

Figure 2:
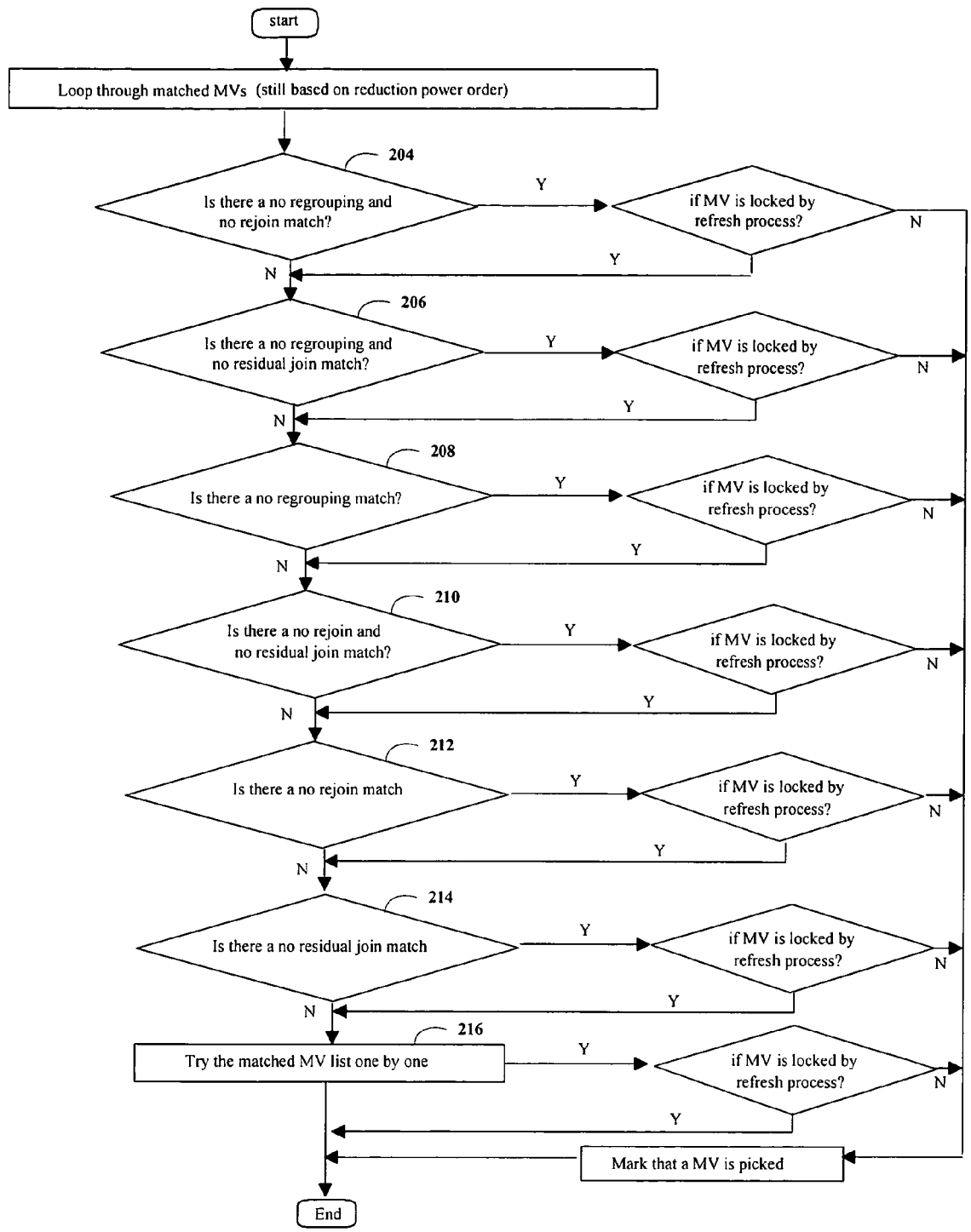

FIGS. 1 and 2 illustrate a method associated with the present invention, wherein the method is used to select an MV among multiple matchings without looping through all the available MV candidates. In step 102, MV candidates are identified. It should be noted that in step 102, if Q does not have an aggregate function (or group by) or DISTINCT in select list (i.e. Q is a join only query/query block), all the MVs with an aggregate function (or group by) or DISTINCT in select list are rejected immediately. In step 104, MV candidates are sorted in descending order based upon the reduction power. In step 106, an iterative process is started starting from the first MV candidate. Next, in step 108, MV definitions are loaded from the catalog. In step 110, a check is performed to see if matching involves no regrouping, no join and no residual join, and if so, a check 112 is performed to see of the MV is locked by the REFRESH process. If the MV is locked and if matching involves no regrouping, no join and no residual join, another check 114 is performed to look for the first matching MV. If there is a match, just as above, another check 116 is performed to see if the MV is locked by the REFRESH process, and if so, another check is performed in step 118 to see if there is a regrouping match. If such a match found, in step 120, a mark is made to indicate that a regrouping match is found. In step 122, a decision is made if regrouping needs to be performed. In step 124, select_MV algorithm is called to pick a best matching MV, and if a MV is not picked, in step 126, a mark is used to indicate that during later matchings one just looks for the first matching MV. As per steps 128 and 130, the process is repeated to until the last MV candidate is reached. Next, in step 132, select_MV algorithm is called to pick a best matching MV.

FIG. 2 illustrates a method for picking an MV using the select_MV algorithm. The method matches a query with materialized views in an ordered list by identifying a materialized view candidate that is not locked by a REFRESH process. In step 204, a check is performed to see if there is no regrouping and no rejoin matching. In step 206, a check is performed to see if there is no regrouping and no residual join rejoin matching. In step 208, a check is performed to see if there is a no regrouping match. Lastly, in steps 210–214, checks are performed to see if there is a no rejoin and no residual join matching. In step 216, the matched MV list is tried one by one and if the MV is not locked by the refresh process, that particular MV is picked.

Provided below are some examples outlining the methodology associated with the present invention. In this specific example, there are six MVs (listed below) sorted based on reduction power and none of them are locked by the REFRESH process.

MV1:
SELECT T1.C1, SUM(T1.C3)
FROM T1, T2
WHERE T1.C1>200 AND T1.C1=T2.C1
GROUP BY T1.C1;
MV2:
SELECT T1.C1, SUM(T1.C3)
FROM T1
WHERE T1.C1>100
GROUP BY T1.C1;
MV3:
SELECT T1.C1, T1.C2, SUM(T1.C3)
FROM T1
WHERE T1.C1>300
GROUP BY T1.C1, T1.C2;
MV4:
SELECT T1.C1, T1.C2, SUM(T1.C3)
FROM T1
WHERE T1.C1>100
GROUP BY T1.C1, T1.C2;
MV5:
SELECT T1.C1, T1.C2, SUM(T1.C3)
FROM T1, T2
WHERE T1.C1>10 AND T1.C1=T2.C2
GROUP BY T1.C1, T1.C2;
MV6:
SELECT T1.C1, T1.C2, T1.C3, SUM(T1.C3)
FROM T1
WHERE T1.C1>0
GROUP BY T1.C1, T1.C2, T1.C3;

Consider the following query examples. In the discussion, Q and MV are called an exact match even when there are predicates and expression derivation required, as long as there is no regrouping, rejoin, and residual join.

Query1:
SELECT T1.C1, SUM(T1.C3)
FROM T1
WHERE T1.C1>100
GROUP BY T1.C1;
MV selection process:
1) Try MV1 first—It does not match since the predicates of MV1 do not match with the predicates of the query.
2) Try MV2—It is an exact match, so MV2 is picked for a query rewrite.

Query2:
SELECT T1.C1, SUM(T1.C3)
FROM T1, T2
WHERE T1.C1>100
GROUP BY T1.C1;
MV selection process:
1) Try MV1 first—It does not match since the predicates of MV1 do not match with the predicates of the query.
2) Try MV2—It is a match with residual join, no regrouping and no rejoin.
3) Try MV3—It is a match with regrouping and the matching process is stopped and MV2 is picked for a query rewrite.

Query3:
SELECT T1.C1, SUM(T1.C3)
FROM T1, T2
WHERE T1.C1>300 AND T1.C2>5 AND T1.C1=T2.C1
GROUP BY T1.C1;
MV selection process:
1) Try MV1 first—It is a match with rejoin since T1.C2 is not in the select list of MV1. But there is no regrouping and no residual join.
2) Try MV2—It is a match with residual join, rejoin and no regrouping. (Assume T1.C1=T2.C1 satisfies no regrouping condition)
3) Try MV3—It is a match with regrouping and the matching process is stopped and MV1 is picked for a query rewrite.

Query4:
SELECT T1.C1, SUM(T1.C3)
FROM T1, T3
WHERE T1.C1>100 AND T1.C2>5 AND T1.C1=T3.C1
GROUP BY T1.C1;
MV selection process:
1) Try MV1 first—It does not match since the predicates of MV1 do not match with query.
2) Try MV2—It is a match with residual join, rejoin and no regrouping.
3) Try MV3—It is a match with regroup, and the matching process is stopped and MV2 is picked for a query rewrite.

Query5:
SELECT T1.C1, SUM(T1.C3)
FROM T1, T2
WHERE T1.C1>50 AND T1.C1=T2.C2
GROUP BY T1.C1;
MV selection process:
1) Try MV1 first—It does not match since the predicates of MV1 do not match with the predicates of the query.
2) Try MV2—It does not match since the predicates of MV2 do not match with the predicates of the query.
3) Try MV3—It is a match with residual join and regrouping.
4) Try MV4—It is a match with residual join and regrouping.
5) Try MV5, it is a match with regroup, no residual join and no rejoin.
6) Try MV6—It is a match with residual join and regrouping. Since it is the last MV, the algorithm goes back to find the best candidate MV5 for a query rewrite.

Additionally, the present invention provides for an article of manufacture comprising computer readable program code contained within implementing one or more modules to execute an efficient heuristic approach in the selection of materialized views when there are matches to an SQL query. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) aiding in receiving a query, Q; (b) ordering materialized view candidates in a list based upon a descending order of reduction powers, wherein reduction power of a materialized view, M, is defined as a product of cardinalities of common tables, T1 through Tn, between query, Q, and materialized view definition, V, divided by the cardinality of M and is given by: |T1|* ... *|Tn|/|M|; and (c) matching a query with materialized views in the ordered list by identifying a materialized view candidate not locked by a REFRESH process, wherein the matching is performed to identify a matching MV as follows:

identifying a matching MV that does not require regrouping, else;
identifying a matching MV that does not require a rejoin, else;
identifying a matching MV that does not require a residual join, else;
identifying an MV with largest reduction power from the list of candidates.

CONCLUSION

A system and method has been shown in the above embodiments for the effective implementation of an efficient heuristic approach in selection of materialized views when there are multiple matchings to an SQL query. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by type of query, type of database, software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A computer-based method using heuristics in selecting a materialized view (MV) from multiple materialized views matching a query, said method comprising the steps of:
   (a) receiving a query, Q;
   (b) ordering materialized view candidates in a list based upon a descending order of reduction powers, wherein reduction power of a material view, M, is a function of cardinalities of common tables between query, Q, and materialized view definition, V, and cardinality of M;
   (c) matching a query with materialized views in said ordered list by identifying a materialized view candidate based on any of, or a combination of, the following heuristics: avoiding choosing an MV which is locked by REFRESH process, choosing a matching that does not require regrouping, choosing a matching that does not require a rejoin, choosing a matching that does not have a residual join, choosing an MV with the largest reduction power; and
   (d) outputting said materialized view candidate identified in (c).

2. A computer-based method using heuristics in selecting a materialized view (MV) from multiple materialized views matching a query, as per claim 1, wherein said query is an SQL query.

3. A computer-based method using heuristics in selecting a materialized view (MV) from multiple materialized views matching a query, as per claim 1, wherein said reduction power of a materialized view, M, is defined as a product of cardinalities of common tables, T1 through Tn, between query, Q, and materialized view definition, V, divided by the cardinality of M, as given by: |T1|* ... *|Tn|/|M|.

4. A computer-based method using heuristics in selecting a materialized view (MV) from multiple materialized views matching a query, as per claim 1, wherein said method further comprises the steps of:

rewriting said received query based upon identified materialized view candidate; and comparing a cost associated with said received query and said rewritten query and identifying query with a lower cost; and executing said query with lower cost.

5. A computer-based method using heuristics in selecting a materialized view (MV) from multiple materialized views matching a query, as per claim 1, wherein said matching step further comprises:
  (a) looping sorted list of MV candidates starting from first MV candidate as a current candidate;
  (b) loading MV definition from catalog;
  (c) checking if matching involves regrouping, joining, or residual joining, and, if current MV candidate is locked by REFRESH process;
  (d) checking if first matching MV is not a match;
  (e) checking and marking if no regrouping match is found;
  (f) identifying if no regrouping match was found and if the current MV candidate needs regrouping, and if so, picking best matching MV using said heuristics and if a MV is not picked, marking the picked MV such that during later matching the first matching MV is picked, whereby abovementioned steps are repeated for each MV candidate in said list.

6. A computer-based method using heuristics in selecting a materialized view (MV) from multiple materialized views matching a query, as per claim 5, wherein said method further comprises the steps of:
  (a) looping through matched MVs based on reduction power order;
  (b) checking if there is regrouping and rejoin matching and if MV is locked by REFRESH processing, else marking current MV as selected MV;
  (c) checking if there is regrouping matching and if MV is locked by REFRESH processing, else marking current MV as selected MV;
  (d) checking if there is a rejoin matching and residual join matching and if MV is locked by REFRESH processing, else marking current MV as selected MV;
  (e) checking if there is a rejoin matching and if MV is locked by REFRESH processing, else marking current MV as selected MV;
  (f) checking if there is a residual join matching and if MV is locked by REFRESH processing, else marking current MV as selected MV,
  whereby abovementioned steps are repeated for each MV candidate until an MV is picked and outputted.

7. A computer-based method using heuristics in selecting a materialized view (MV) from multiple materialized views matching a query, as per claim 1, wherein said method is implemented across one or more networks.

8. A computer-based method using heuristics in selecting a materialized view (MV) from multiple materialized views matching a query, as per claim 7, wherein network is any of the following: local area network, wide area network, or the Internet.

9. An article of manufacture comprising a computer usable medium having computer readable program code embodied therein which implements heuristics to select a materialized view (MV) from multiple materialized views matching a query, said medium comprising:
  (a) computer readable program code aiding in receiving a query, Q;
  (b) computer readable program code ordering materialized view candidates in a list based upon a descending order of reduction powers, wherein reduction power is a function of cardinalities of common tables between query, Q, and materialized view definition, V, and cardinality of M; and
  (c) computer readable program code matching a query with materialized views in said ordered list by identifying a materialized view candidate based on any of, or a combination of, the following heuristics: avoid choosing an MV which is locked by REFRESH process, choosing a matching that does not require regrouping, choosing a matching that does not require a rejoin, choosing a matching that does not have a residual join, choosing an MV with the largest reduction power; and
  (d) outputting said materialized view candidate identified in (c).

10. An article of manufacture comprising a computer usable medium having computer readable program code embodied therein which implements heuristics to select a materialized view (MV) from multiple materialized views matching a query, as per claim 9, wherein said reduction power of a materialized view, M, is defined as a product of cardinalities of common tables, T1 through Tn, between query, Q, and materialized view definition, V, divided by the cardinality of M, as given by:

|T1|* . . . *|Tn|/|M|.

11. An article of manufacture comprising a computer usable medium having computer readable program code embodied therein which implements heuristics to select a materialized view (MV) from multiple materialized views matching a query, as per claim 9, wherein said medium further comprises:
  (a) computer readable program code looping sorted list of MV candidates starting from first MV candidate as a current candidate;
  (b) computer readable program code loading MV definition from catalog;
  (c) computer readable program code checking if matching involves regrouping, joining, or residual joining, and, if current MV candidate is locked by REFRESH process;
  (d) computer readable program code checking if first matching MV is not a match;
  (e) computer readable program code checking and marking if no regrouping match is found;
  (f) computer readable program code identifying if no regrouping match was found and if the current MV candidate needs regrouping, and if so, picking best matching MV using said heuristics and if a MV is not picked, marking the picked MV such that during later matching the first matching MV is picked,
  whereby computer readable program code repeats abovementioned steps for each MV candidate in said list.

12. An article of manufacture comprising a computer usable medium having computer readable program code embodied therein which implements heuristics to select a materialized view (MV) from multiple materialized views matching a query, as per claim 11, wherein said medium further comprises:
  (a) computer readable program code looping through matched MVs based on reduction power order;
  (b) computer readable program code checking if there is a regrouping and rejoin matching and if MV is locked by REFRESH processing, else marking current MV as selected MV;

(c) computer readable program code checking if there is a regrouping matching and if MV is locked by REFRESH processing, else marking current MV as selected MV;
(d) computer readable program code checking if there is a rejoin matching and residual join matching and if MV is locked by REFRESH processing, else marking current MV as selected MV;
(e) computer readable program code checking if there is a rejoin matching and if MV is locked by REFRESH processing, else marking current MV as selected MV;
(f) computer readable program code checking if there is a residual join matching and if MV is locked by REFRESH processing, else marking current MV as selected MV,
whereby computer readable program code repeats above-mentioned steps for each MV candidate until an MV is picked.

13. An article of manufacture comprising a computer usable medium having computer readable program code embodied therein which implements heuristics to select a materialized view (MV) from multiple materialized views matching a query, as per claim 9, wherein said query is an SQL query.

14. A computer-based method using heuristics in selecting a materialized view (MV) from multiple materialized views matching a query, said method comprising the steps of:
 (a) receiving a query, Q;
 (b) ordering materialized view candidates in a list based upon a descending order of reduction powers, wherein reduction power of a materialized view, M, is defined as a product of cardinalities of common tables, T1 through Tn, between query, Q, and material definition, V, divided by the cardinality of M as given by:
 $|T1|* \ldots *|Tn|/|M|$;
 (c) matching a query with materialized views in said ordered list by identifying a materialized view candidate not locked by a REFRESH process, said matching performed until a materialized view candidate is identified as follows:
  identifying an MV candidate as a matching MV that does not require a regrouping, else;
  identifying an MV candidate as a matching MV that does not require a rejoin, else;
  identifying an MV candidate as a matching MV that does not require a residual join, else;
  identifying an MV candidate as an MV with largest reduction power from said list of and; and
 (d) outputting said identified materialized view candidate in (c).

15. A computer-based method using heuristics in selecting a materialized view (MV) from multiple materialized views matching a query, as per claim 14, wherein said method further comprises the steps of:
 rewriting said received query based upon identified materialized view candidate; and
 comparing a cost associated with said received query and said rewritten query and identifying query with a lower cost; and
 executing said query with lower cost.

16. A computer-based method using heuristics in selecting a materialized view (MV) from multiple materialized views matching a query, as per claim 14, wherein said query is an SQL query.

17. A computer-based method using heuristics in selecting a materialized view (MV) from multiple materialized views matching a query, as per claim 14, wherein said method is implemented across one or more networks.

18. A computer-based method using heuristics in selecting a materialized view (MV) from multiple materialized views matching a query, as per claim 17, wherein network is any of the following: local area network, wide area network, or the Internet.

19. An article of manufacture comprising a computer usable medium having computer readable program code embodied therein which implements heuristics to select a materialized view (MV) from multiple materialized views matching a query, said medium comprising:
 (a) computer readable program code aiding in receiving a query, Q;
 (b) computer readable program code ordering materialized view candidates in a list based upon a descending order of reduction powers, wherein reduction power of a materialized view, M, is defined as a product of cardinalities of common tables, T1 through Tn, between query, Q, and materialized view definition, V, divided by the cardinality of M as given by:
 $|t1|* \ldots *|Tn|/|M|$;
 (c) computer readable program code matching a query with materialized views in said ordered list by identifying a materialized view candidate not locked by a REFRESH process, said matching performed until a materialized view candidate is identified as follows:
  computer readable program code identifying an MV candidate as a matching MV that does not require regrouping, else;
  computer readable program code identifying an MV candidate as a matching MV that does not require a rejoin, else;
  computer readable program code identifying an MV candidate as a matching MV that does not require a residual join, else;
  computer readable program code identifying an MV candidate as an MV with largest reduction power from said list of candidates; and
 (d) computer readable program code aiding in outputting said identified materialized view candidate in (c).

20. An article of manufacture comprising a computer usable medium having computer readable program code embodied therein which implements heuristics to select a materialized view (MV) from multiple materialized views matching a query, as per claim 19, wherein said medium further comprises:
 computer readable program code rewriting said received query based upon identified materialized view candidate; and
 computer readable program code comparing a cost associated with said received query and said rewritten query and identifying query with a lower cost; and
 computer readable program code executing said query with lower cost.

21. An article of manufacture comprising a computer usable medium having computer readable program code embodied therein which implements heuristics to select a materialized view (MV) from multiple materialized views matching a query, as per claim 19, wherein said query is an SQL query.

* * * * *